Patented Oct. 12, 1954

2,691,595

UNITED STATES PATENT OFFICE 2,691,595

BLACK HECTOGRAPH PRINTING INK

Walter G. Drautz, Glenmont, N. Y., assignor to General Aniline & Film Corporation, New York, N. Y., a corporation of Delaware No Drawing. Application September 2, 1950, Serial No. 183,089

6 Claims. (Cl. 106—22)

This invention relates to duplicating inks for use in the hectographic process, and more particularly to a black ink of that type.

It is generally known in the art relating to hectograph duplicating materials that a black hectograph ink which will meet the requirements of repeated use is difficult to obtain. In order to be of value as a black hectograph ink it must be capable of printing a great many, as for example from 150 to 200, copies in a good deep black shade from a single master copy, and the last print made should not differ greatly in shade from the first print. Some known compositions give good deep black prints originally but on continued use the copies change to bluish, yellowish, or reddish shadings after about 20 copies have been made. This is due to the fact that a combination of spirit-soluble shading colors which blend to a shade approaching black is employed; for example a mixture of the soluble dyes Crystal Violet (salt of hexamethylpararosaniline), Brilliant or Ethyl Green (salt of tetraethyl diamidotriphenyl-carbinol), Magenta (mixture of pararosaniline and rosaniline), and Chrysoidine (salt of diamido azo benzene) may be employed. The uneven exhaust rates of these combined colors create a progressive imbalance in the proportion of the colors necessary to blend to a black as the hectograph medium is used. Consequently, the color remaining in the largest proportion will predominate.

It has now been found that a black hectographic ink can be produced by mixing certain azo dyes with black shading colors such as Euchrysine and Crystal Violet and blending the resulting mixture with a mixture of soluble dyestuff salts which will combine to produce a black. The black hectographic ink resulting from this combination when applied to a hectographic medium in the usual manner will remain black and strong upon repeated use.

The azo dyes which have been found to be particularly suitable for this purpose are selected from the class represented by the formula

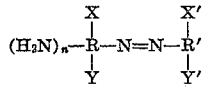

wherein $n$ is a whole number from 1 to 2; R and R' are aryl radicals, such as phenyl, toluyl, naphthyl, etc.; X and Y are the same or different members of the group consisting of H, halogen, such as chlorine, bromine, etc., alkyl, such as methyl, ethyl, propyl, butyl, amyl, octyl, etc., and alkoxy, such as methoxy, ethoxy, propoxy, butyroxy, etc; X' and Y' are the same or different members of the group consisting of H, alkyl, as above, alkoxy, as above, carboxy; and

where $a$ and $b$ are H, alkyl, as above, hydroxyalkyl, such as hydroxymethyl, β-hydroxyethyl, γ-hydroxypropyl, etc.; and acidyl, such as acetyl, propionyl, benzoyl, phenylsulfonyl, ethylsulfonyl, toluylsulfonyl, etc.

In the preparation of this composition I dissolve an azo dye of the above class in warm denatured ethyl alcohol, for which may be substituted other volatile aliphatic alcohols such as methyl, propyl, and isopropyl alcohols. To this solution I add a Euchrysine dye, such as Euchrysine 2GA (AATCC, 1947, page 195) and Crystal Violet. This mixture is then dried and milled with a suitable wax, such as carnauba, or a polyethylene glycol wax, such as "Carbowax 4000." In this mixture, which may be designated as "A," the black azo dye of the above class may vary from about 40 to 46 parts and the Crystal Violet from 50 to 43 parts by weight, the remainder being the Euchrysine dye.

Another mixture, "B," is prepared by mixing soluble salts of black shading dyes, such as Chrysoidine RS (C. I. 21), Crystal Violet APX (C. I. 681), Victoria Pure Blue BGO (AATCC, 1947, page 236), Euchrysine 3RX (C. I. 788), and Euchrysine 2GA Conc. (AATCC, 1947, page 195), in water or alcohol, if necessary, at a temperature of from 100 to 130° C. This mixture is stirred until dissolved and then dried to a powder at 130° C. The two mixtures, A and B, are then milled together in the weight ratio of A to B of from 3:1 to 1:1.

The complete mixing which results from the alcohol pasting and drying down of the A mixture assists considerably in producing the blending of the black azo dye and the black shading dyes necessary to produce good black prints for all copies throughout the life of the hectograph material. The heating of the B mixture to 100 to 130° C. during the mixing is also important, tending as it does toward the formation of a more homogeneous powder and thus contributing toward the printing of even black shades throughout.

The following examples will serve to further illustrate the invention in its more specific aspects, it being understood that the conditions and proportions thereof do not constitute limitations, but illustrations:

Example 1

Mixture A.—43 parts of the azo dyestuff of the formula

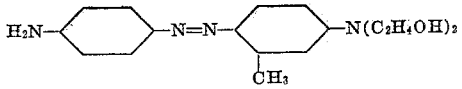

are dissolved in 150 parts of warm denatured ethyl alcohol. 10 parts of Euchrysine 2GA (AATCC, 1947, page 195) are stirred in until dissolved. 47 parts Crystal Violet APX (C. I. 681) are then stirred in. The mixture is dried and milled with 7 parts of carnauba wax.

Mixture B.—The following components are combined with 150 parts of water:

34 parts Chrysoidine RS (C. I. 21)
31 parts Chrystal Violet APX
11 parts Victoria Pure Blue BGO (AATCC, 1947, page 236)
17 parts Euchrysine 3RX (C. I. 788)
7 parts Euchrysine 2GA conc. (AATCC, 1947, page 195)

The solution is heated to from 100 to 130° C. during the mixing and the mixture is stirred until the dyes have dissolved. Alcohol alone or a mixture of alcohol and water may be used if necessary to assist in the solution of the dyes. After solution has been completed, the mixture is dried to a powder at 130° C.

75 parts of mixture A and 25 parts of mixture B are milled together to produce a black dyestuff composition which will give homogeneous and strong black prints during the printing life of the hectograph master copy.

50 parts of mixture A may be combined with 50 parts of mixture B and milled together to also give a good hectograph black dye, the shade of which remains black and strong on repeated use.

Example 2

Mixture A.—40 parts of the azo dyestuff of the formula

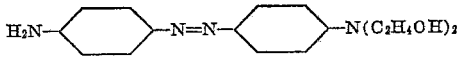

are dissolved in 150 parts of warm denatured ethyl alcohol. 10 parts of Euchrysine 2GA (AATCC, 1947, page 195) are stirred in until dissolved. 50 parts Crystal Violet APX (C. I. 681) are then stirred in. The mixture is dried and milled with 7 parts of carnauba wax.

Mixture B.—The following components are combined with 150 parts of water:

34 parts Chrysoidine RS (C. I. 21)
31 parts Crystal Violet APX
11 parts Victoria Pure Blue BGO (AATCC, 1947, page 236)
17 parts Euchrysine 3RX (C. I. 788)
7 parts Euchrysine 2GA conc. (AATCC, 1947, page 195)

The solution is heated to from 100 to 130° C. during the mixing and the mixture is stirred until the dyes have dissolved. Alcohol alone or a mixture of alcohol and water may be used if necessary to assist in the solution of the dyes. After solution has been completed, the mixture is dried to a powder at 130° C.

75 parts of mixture A and 25 parts of mixture B are milled together to produce a black dyestuff composition which will give homogeneous and strong black prints during the printing life of the hectograph master copy.

50 parts of mixture A may be combined with 50 parts of mixture B and milled together to also give a good hectograph black dye, the shade of which remains black and strong on repeated use.

Example 3

Mixture A.—45 parts of the azo dyestuff of the formula

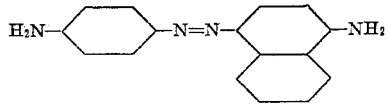

are dissolved in 150 parts of warm denatured ethyl alcohol. 10 parts of Euchrysine 2GA are stirred in until dissolved. 45 parts Crystal Violet APX are then stirred in. The mixture is dried and milled with 7 parts of carnauba wax.

Mixture B.—The following components are combined with 150 parts of water:

34 parts Chrysoidine RS
31 parts Crystal Violet APX
11 parts Victoria Pure Blue BGO
17 parts Euchrysine 3RX
7 parts Euchrysine 2GA conc.

The solution is heated to from 100 to 130° C. during the mixing and the mixture is stirred until the dyes have dissolved. Alcohol alone or a mixture of alcohol and water may be used if necessary to assist in the solution of the dyes. After solution has been completed, the mixture is dried to a powder at 130° C.

75 parts of mixture A and 25 parts of mixture B are milled together to produce a black dyestuff composition which will give homogeneous and strong black prints during the printing life of the hectograph master copy.

50 parts of mixture A may be combined with 50 parts of mixture B and milled together to also give a good hectograph black dye, the shade of which remains black and strong on repeated use.

Example 4

Mixture A.—46 parts of the azo dyestuff of the formula

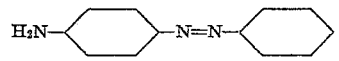

are dissolved in 150 parts of warm denatured ethyl alcohol. 11 parts of Euchrysine 2GA are stirred in until dissolved. 43 parts of Crystal Violet APX are then stirred in. The mixture is dried and milled with 7 parts of carnauba wax.

Mixture B.—The following components are combined with 150 parts of water:

34 parts Chrysoidine RS
31 parts Crystal Violet APX
11 parts Victoria Pure Blue BGO
17 parts Euchrysine 3RX
7 parts Euchrysine 2GA conc.

The solution is heated to from 100 to 130° C. during the mixing and the mixture is stirred until the dyes have dissolved. Alcohol may be added if necessary to assist in the solution of the dyes. After solution has been completed, the mixture is dried to a powder at 130° C.

75 parts of mixture A and 25 parts of mixture B are milled together to produce a black dyestuff composition which will give homogeneous and strong black prints during the printing life of the hectograph master copy.

50 parts of mixture A may be combined with 50 parts of mixture B and milled together to also give a good hectograph black dye, the shade of which remains black and strong on repeated use.

*Example 5*

Mixture A.—42 parts of the azo dyestuff of the formula

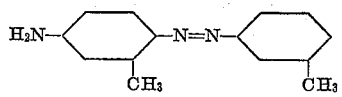

are dissolved in 150 parts of warm denatured ethyl alcohol. 10 parts of Euchrysine 2GA are stirred in until dissolved. 48 parts Crystal Violet APX are then stirred in. The mixture is dried and milled with 7 parts of carnauba wax.

Mixture B.—The following components are combined with 150 parts of water:

34 parts Chrysoidine RS
31 parts Crystal Violet APX
11 parts Victoria Pure Blue BGO
17 parts Euchrysine 3RX
7 parts Euchrysine 2GA conc.

The solution is heated to from 100 to 130° C. during the mixing and the mixture is stirred until the dyes have dissolved. Alcohol alone or a mixture of alcohol and water may be used if necessary to assist in the solution of the dyes. After solution has been completed, the mixture is dried to a powder at 130° C.

75 parts of mixture A and 25 parts of mixture B are milled together to produce a black dyestuff composition which will give homogeneous and strong black prints during the printing life of the hectograph master copy.

50 parts of mixture A may be combined with 50 parts of mixture B and milled together to also give a good hectograph black dye, the shade of which remains black and strong on repeated use.

In the above examples azo dyes having the following formulae may be substituted for the azo dyes employed in the A mixtures in similar proportions:

(A) 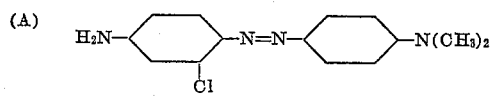

(B) 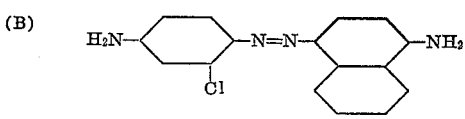

(C) 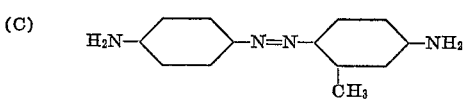

(D) 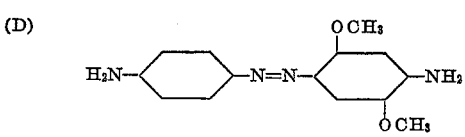

(E) 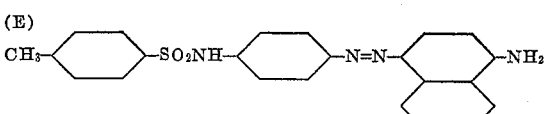

(F) 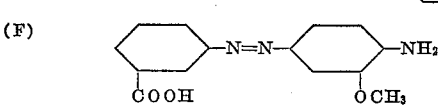

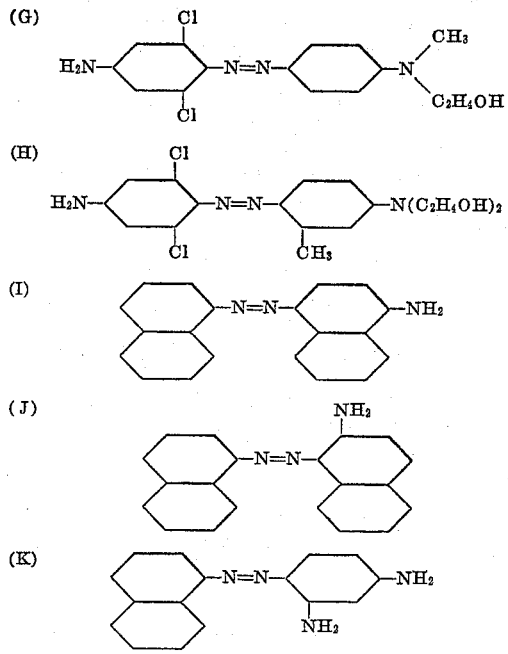

It will be understood that the compositions of this application can be worked up in any known method with suitable vehicles to produce the proper flow characteristics and drying properties necessary for the coating of the paper or other carrier in forming the hectograph duplicating material. One effective method of making a suitable coating composition is to melt the wax, such as beeswax, and then add oleostearine, mutton tallow, or lard oil, or other suitable greasy or oily substance. This mixture is then cooled, or having been previously mixed and cooled, is reheated to approximately 138° F. and the dye mixtures are added thereto. A uniform paste-like mass is thereby formed wherein the dye particles are intimately dispersed. This mass or ink composition flows sufficiently for coating on a sheet of paper or the like at a temperature of about 138° F. When so melted it is flowed or otherwise applied as a coating on the carrier.

I claim:

1. A printing ink for hectographic transfer medium comprising a mixture A containing from 40 to 46 parts of an azo dye of the formula

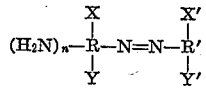

wherein $n$ is a whole number from 1 to 2, R and R' are aryl radicals, X and Y are members of the group consisting of H, halogen, alkyl, and alkoxy, X' and Y' are members of the group consisting of H, alkyl, alkoxy, carboxy, and

wherein $a$ and $b$ are members of the group consisting of H, alkyl, hydroxyalkyl, and acidyl, and from 50 to 43 parts of Crystal Violet salt, the remainder being Euchrysine salt, and a mixture B containing water-soluble black shading dyestuff salts which mixture of salts consists of about 34 parts Chrysoidine, about 31 parts Crystal Violet, about 11 parts Victoria Pure Blue, and about 24 parts Euchrysine salts, the said mixtures A and B being combined in the A to B ratio of from 3:1 to 1:1 by weight.

2. A printing ink for hectographic transfer medium comprising a mixture A containing 43 parts of the azo dye having the formula

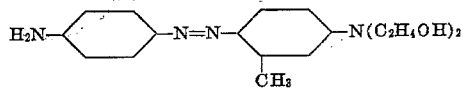

47 parts of Crystal Violet APX and 10 parts of Euchrysine 2GA, and a mixture B containing water-soluble black shading dyestuff salts, which mixture of salts consists of about 34 parts Chrysoidine, about 31 parts Crystal Violet, about 11 parts Victoria Blue and about 24 parts Euchrysine salts, the said mixtures A and B being combined in the A to B ratio of from 3:1 to 1:1 by weight.

3. A printing ink for hectographic transfer medium comprising a mixture A containing 40 parts of the azo dye having the formula

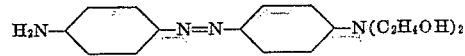

50 parts of Crystal Violet APX and 10 parts of Euchrysine 2GA, and a mixture B containing water-soluble black shading dyestuff salts, which mixture of salts consists of about 34 parts Chrysoidine, about 31 parts Crystal Violet, about 11 parts Victoria Blue and about 24 parts Euchrysine salts, the said mixtures A and B being combined in the A to B ratio of from 3:1 to 1:1 by weight.

4. A printing ink for hectographic transfer medium comprising a mixture A containing 45 parts of the azo dye having the formula

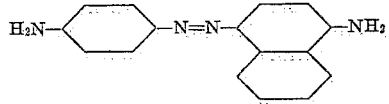

45 parts of Crystal Violet APX and 10 parts of Euchrysine 2GA, and a mixture B containing water-soluble black shading dyestuff salts, which mixture of salts consists of about 34 parts Chrysoidine, about 31 parts Crystal Violet, about 11 parts Victoria Blue and about 24 parts Euchrysine salts, the said mixtures A and B being combined in the A to B ratio of from 3:1 to 1:1 by weight.

5. A printing ink for hectographic transfer medium comprising a mixture A containing 46 parts of the azo dye having the formula

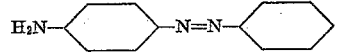

43 parts of Crystal Violet APX and 11 parts of Euchrysine 2GA, and a mixture B containing water-soluble black shading dyestuff salts, which mixture of salts consists of about 34 parts Chrysoidine, about 31 parts Crystal Violet, about 11 parts Victoria Blue and about 24 parts Euchrysine salts, the said mixtures A and B being combined in the A to B ratio of from 3:1 to 1:1 by weight.

6. A printing ink for hectographic transfer medium comprising a mixture A containing 42 parts of the azo dye having the formula

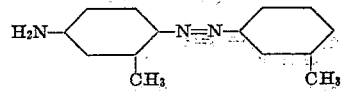

48 parts of Crystal Violet APX and 10 parts of Euchrysine 2GA, and a mixture B containing water-soluble black shading dyestuff salts, which mixture of salts consists of about 34 parts Chrysoidine, about 31 parts Crystal Violet, about 11 parts Victoria Blue and about 24 parts Euchrysine salts, the said mixtures A and B being combined in the A to B ratio of from 3:1 to 1:1 by weight.

References Cited in the file of this patent

UNITED STATES PATENTS

| Number | Name | Date |
|---|---|---|
| 1,198,442 | Hochstetter | Sept. 19, 1916 |
| 2,138,836 | Brower | Dec. 6, 1938 |
| 2,155,862 | Hughes | Apr. 25, 1939 |
| 2,271,112 | Bjorksten | Jan. 27, 1942 |